(12) United States Patent
Jayachandran et al.

(10) Patent No.: US 10,846,372 B1
(45) Date of Patent: Nov. 24, 2020

(54) SYSTEMS AND METHODS FOR TRUSTLESS PROOF OF POSSESSION AND TRANSMISSION OF SECURED DATA

(71) Applicant: Onu Technology Inc., San Jose, CA (US)

(72) Inventors: Guha Jayachandran, Cupertino, CA (US); Volkmar Frinken, San Jose, CA (US); Patrick Grinaway, Brooklyn, NY (US); Shriphani Palakodety, Palo Alto, CA (US); Galana Gebisa, Mountain View, CA (US)

( * ) Notice: Subject to any disclaimer, the term of this patent is extended or adjusted under 35 U.S.C. 154(b) by 0 days.

(21) Appl. No.: 16/731,415

(22) Filed: Dec. 31, 2019

(51) Int. Cl.
*G06F 21/64* (2013.01)
*G06F 21/00* (2013.01)

(52) U.S. Cl.
CPC .................................. *G06F 21/00* (2013.01)

(58) Field of Classification Search
CPC .... G06F 16/2246; G06F 21/00; G06F 21/602; G06F 21/6218; G06F 21/6227; G06F 21/78; G06F 21/64; H04L 9/3236; H04L 9/3218; G06Q 20/389
See application file for complete search history.

(56) References Cited

U.S. PATENT DOCUMENTS

| | | | |
|---|---|---|---|
| 2005/0091261 A1* | 4/2005 | Wu ......................... | G06F 21/64 |
| 2014/0245006 A1* | 8/2014 | Papamanthou ......... | G06F 21/64 |
| | | | 713/168 |
| 2014/0245020 A1* | 8/2014 | Buldas .................. | H04L 9/3265 |
| | | | 713/177 |
| 2018/0025167 A1* | 1/2018 | Bohli ........................ | H04L 9/14 |
| | | | 713/193 |

OTHER PUBLICATIONS

Ateniese, Provable data possession at untrusted stores,CCS07: 14th ACM Conference on Computer and Communications Security 2007•Alexandria Virginia USA•Nov. 2007,pp. 598-609 (Year: 2007).*

* cited by examiner

*Primary Examiner* — Brian F Shaw
(74) *Attorney, Agent, or Firm* — Caldwell Intellectual Property Law

(57) ABSTRACT

A system for trustlessly proving possession of secured data includes a storing device designed and configured to store a collection of data, divide the collection of data into a plurality of lots, receive a cryptographic accumulator of the collection of data, the cryptographic accumulator having a root and a plurality of accumulated elements, wherein each accumulated element is produced by performing an encryption process on each lot of the plurality of lots, evaluate a posting of the root to an immutable sequential listing, select an accumulated element as a function of the root and a public pseudorandom function, generate a secure proof of possession of a data lot used to produce the accumulated element and transmit the secure proof and the accumulated element.

19 Claims, 5 Drawing Sheets

SYSTEMS AND METHODS FOR TRUSTLESS PROOF OF POSSESSION AND TRANSMISSION OF SECURED DATA

FIELD OF THE INVENTION

The present invention generally relates to the field of cryptography. In particular, the present invention is directed to systems and methods for trustless proof of possession and transmission of secured data.

BACKGROUND

Data storage is increasingly performed using distributed resources. A network storage node can use various protocols to ensure that data is securely and robustly stored and can provide virtually unlimited quantities of data storage. However, distributed storage of data poses different security risks than local storage. In particular, it is difficult to verify that a party or device that is purportedly storing a given set of data is actually performing the required storage.

SUMMARY OF THE DISCLOSURE

In an aspect, a system for trustlessly proving possession of secured data includes a storing device designed and configured to store a collection of data, divide the collection of data into a plurality of lots, receive a cryptographic accumulator of the collection of data, the cryptographic accumulator having a root and a plurality of accumulated elements, wherein each accumulated element is produced by performing an encryption process on each lot of the plurality of lots, evaluate a posting of the root to an immutable sequential listing, select an accumulated element as a function of the root and a public pseudorandom function, generate a secure proof of possession of a data lot used to produce the accumulated element, and transmit the secure proof and the accumulated element to the requesting device.

In another aspect, a method of trustlessly proving possession of secured data includes storing, by a storing device, a collection of data. The method includes dividing, by the storing device, the collection of data into a plurality of lots. The method includes receiving, at the storing device, a cryptographic accumulator of the collection of data, the cryptographic accumulator having a root and a plurality of accumulated elements, wherein each accumulated element is produced by performing an encryption process on each lot of the plurality of lots. The method includes evaluating, by the storing device, a posting of the root to an immutable sequential listing. The method includes selecting, by the storing device, an accumulated element as a function of the root and a selection function. The method includes generating, by the storing device, a secure proof of possession of a data lot used to produce the accumulated element. The method includes transmitting, by the storing device, the secure proof and the accumulated element to the requesting device.

In another aspect a non-transitory computer-readable storage medium contains machine-executable instructions for performing a method of trustlessly proving possession of secured data, including storing, by a storing device, a collection of data, dividing, by the storing device, the collection of data into a plurality of lots, receiving, at the storing device, a cryptographic accumulator of the collection of data, the cryptographic accumulator having a root and a plurality of accumulated elements, wherein each accumulated element is produced by performing an encryption process on each lot of the plurality of lots, evaluating, by the storing device, a posting of the root to an immutable sequential listing, selecting, by the storing device, an accumulated element as a function of the root and a selection function, generating, by the storing device, a secure proof of possession of a data lot used to produce the accumulated element, and transmitting, by the storing device, the secure proof and the accumulated element to the requesting device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
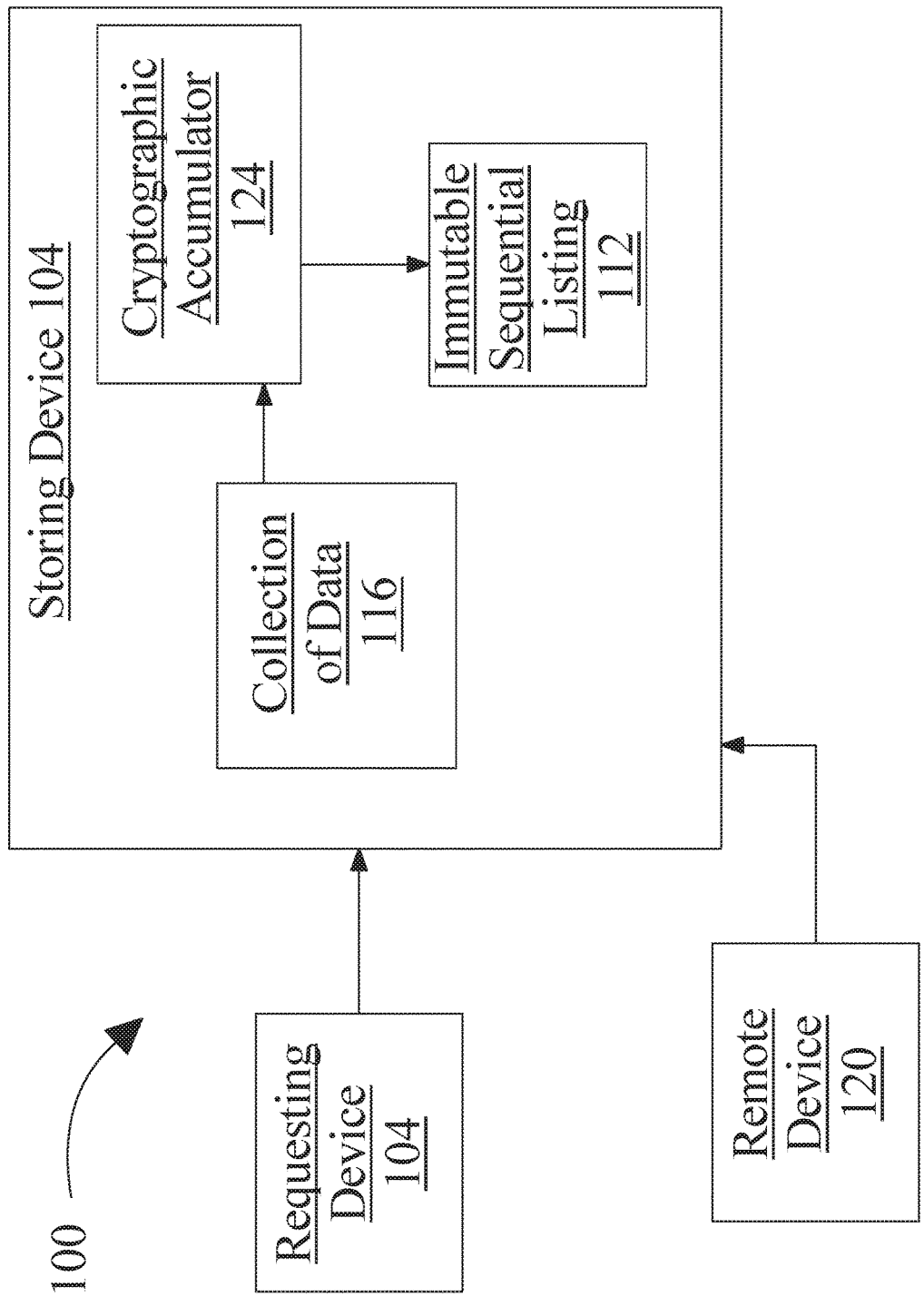
FIG. 1 is a block diagram illustrating an exemplary embodiment of a system for trustlessly proving possession of secured data.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments described in this disclosure provide a means for verification of data storage that can be performed anonymously and publicly without need for trusted third parties or other trust-based protocols. Data stored may be represented on a data structure available to requesting and storing parties alike using a cryptographic accumulator 124; the data structure may be an immutable sequential listing 112. A pseudorandom selection of an accumulated element 300 of accumulator may be transmitted to a requesting device 108 and may be combined with a zero-knowledge proof of possession of a preimage of the accumulated element 300.

In an embodiment, methods and systems described herein may perform implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. A further example of an asymmetric cryptographic system may include a discrete-logarithm based system based upon the relative ease of computing exponents mod a large integer, and the computational infeasibility of determining the discrete logarithm of resulting numbers absent previous knowledge of the exponentiations; an example of such a system may include Diffie-Hellman key exchange and/or public key encryption. Another example is elliptic curve cryptography, which relies on the fact that given two points P and Q on an elliptic curve over a finite field, a definition of the inverse of a point −A as the point with negative y-coordinates, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q. A further example of asymmetrical cryptography may include lattice-based cryptography, which relies on the fact that various properties of sets of integer combination of basis vectors are hard to compute, such as finding the one combination of basis vectors that results in the smallest Euclidean distance Embodiments of cryptography, whether symmetrical or asymmetrical, may include quantum-secure cryptography, defined for the purposes of this disclosure as cryptography that remains secure against adversaries possessing quantum computers; some forms of lattice-based cryptography, for instance, may be quantum-secure.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments of systems and methods described herein may generate, evaluate, and/or utilize digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described in further detail below, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of a system 100 for trustlessly proving possession of secured data is illustrated. System includes a storing device 104. Storing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Storing device 104 may include a single computing device operating independently, or may include two or more computing device operating in concert, in parallel, sequentially or the like; two or more computing devices may be included together in a single computing device or in two or more computing devices. Storing device 104 may interface or communicate with one or more additional devices as described below in further detail via a network interface device. Network interface device may be utilized for connecting storing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Storing device 104 may include but is not limited to, for example, a computing device or cluster of computing devices in a first location and a second computing device or cluster of computing devices in a second location. Storing device 104 may include one or more computing devices dedicated to data storage, security, distribution of traffic for load balancing, and the like. Storing device 104 may distribute one or more computing tasks as described below across a plurality of computing devices of computing device, which may operate in parallel, in series, redundantly, or in any other manner used for distribution of tasks or memory between computing devices. Storing device 104 may be implemented using a "shared nothing" architecture in which data is cached at the worker, in an embodiment, this may enable scalability of system 100 and/or computing device.

Storing device 104 may be designed and/or configured to perform any method, method step, or sequence of method steps in any embodiment described in this disclosure, in any order and with any degree of repetition. For instance, storing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Storing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. System 100 may include a non-transitory computer-readable storage medium containing machine-executable instructions for performing methods and/or method steps in any way in which storing device 104 may perform such method steps.

Still referring to FIG. 1, storing device 104 may communicate with at least a requesting device 108. A requesting device 108 may include any computing device suitable for use as storing device 104 as described above. At least a requesting device 108 may include a device requesting storage of data, such as a device providing collection of data, providing inputs to be converted and/or used to produce collection of data with a given program, and/or otherwise indicating data to be produced and/or generated, or the like, a device requesting and/or evaluating proof of storage of data, and/or a device requesting transmission and/or provision of stored data. Storing device 104 may communicate with requesting device 108 via any network communication protocol, including without limitation transfer control protocol-internet protocol (TCP-IP), file transfer protocol (FTP), or the like. Communication may be performed securely, for instance using secure sockets layer (SSL) protocols or the like. Storing device 104 may communicate with requesting device 108 by posting information to and/or receiving information from an immutable sequential listing 112. An "immutable sequential listing 112," as used in this disclosure, is a data structure that places data entries in a fixed sequential arrangement, such as a temporal sequence of entries and/or blocks thereof, where the sequential arrangement, once established, cannot be altered or reordered. An immutable sequential listing 112 may be, include and/or implement an immutable ledger, where data entries that have been posted to the immutable sequential listing 112 cannot be altered.

Figure 2:
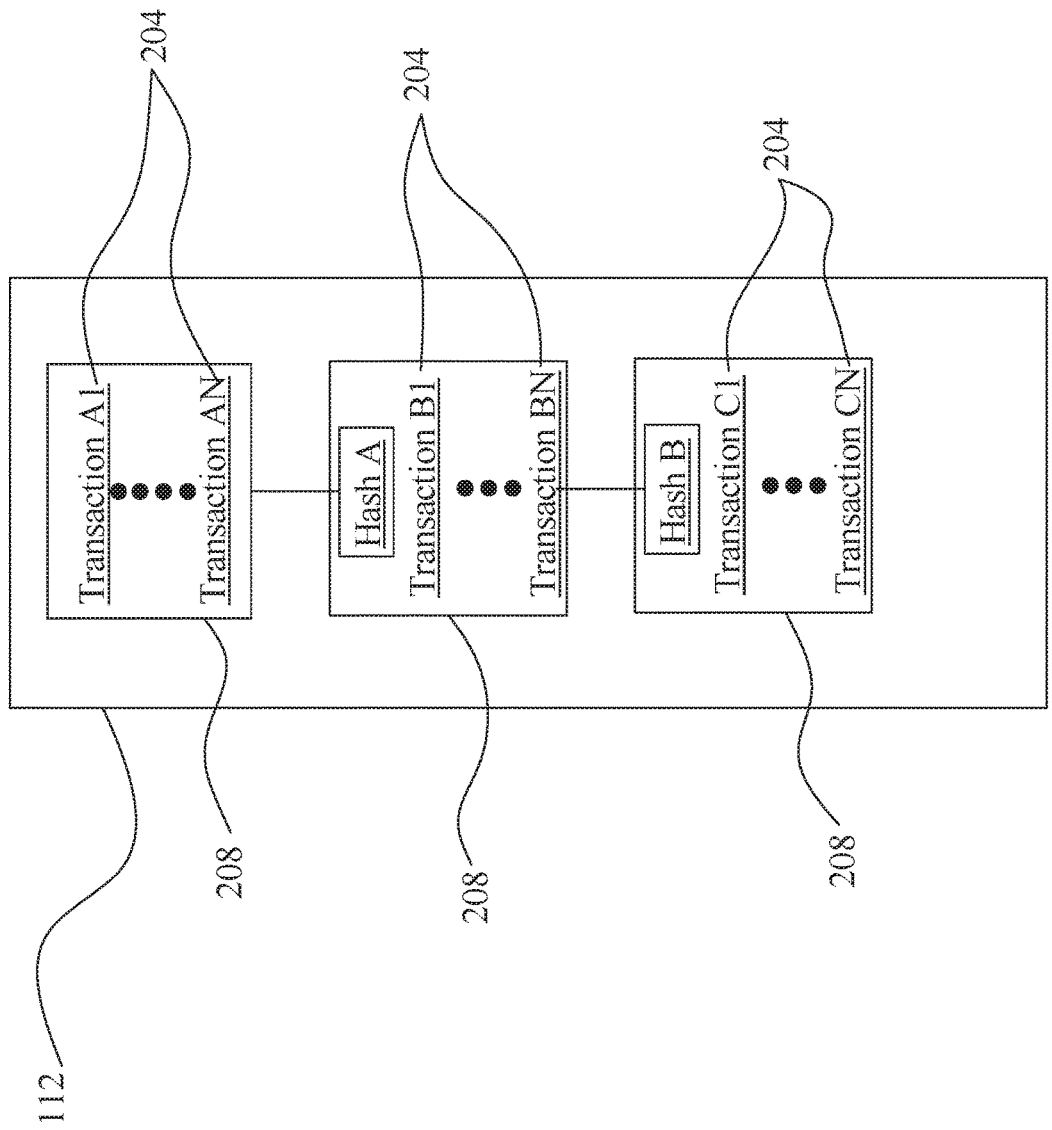
FIG. 2 is a block diagram illustrating an exemplary embodiment of an immutable sequential listing.

Referring now to FIG. 2, an exemplary embodiment of an immutable sequential listing 112 is illustrated. Data elements are listing in immutable sequential listing 112; data elements may include any form of data, including textual data, image data, encrypted data, cryptographically hashed data, and the like. Data elements may include, without limitation, one or more at least a digitally signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root 308 or node 304 of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node 304 as described in further detail below.

In an embodiment, and still referring to FIG. 2 immutable sequential listing 112 records a series of postings in a way that preserves the order in which the postings took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 112 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 112 may preserve the order in which the postings took place by listing them in chronological order; alternatively or additionally, immutable sequential listing 112 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which postings took place by listing them in sub-listings 208 and placing the sub-listings 208 in chronological order. The immutable sequential listing 112 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add postings to the ledger, but may not allow any users to alter postings that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 112 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 112, once formed, may be inalterable by any party, no matter what access rights that party possesses. For instance, immutable sequential listing 112 may include a hash chain, in which data is added during a successive hashing process to ensure non-repudiation. Immutable sequential listing 112 may include a block chain. In one embodiment, a block chain is immutable sequential listing 112 that records one or more new postings in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any postings listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the immutable sequential listing 112 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake"

protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in immutable sequential listing 112 may contain a record or posting describing one or more addresses that receive an incentive, such as virtual currency, as the result of successfully mining the sub-listing 208.

With continued reference to FIG. 2, where two entities simultaneously create new sub-listings 208, immutable sequential listing 112 may develop a fork; protocol may determine which of the two alternate branches in the fork is the valid new portion of the immutable sequential listing 112 by evaluating, after a certain amount of time has passed, which branch is longer. "Length" may be measured according to the number of sub-listings 208 in the branch. Length may be measured according to the total computational cost of producing the branch. Protocol may treat only postings contained the valid branch as valid postings. When a branch is found invalid according to this protocol, postings registered in that branch may be recreated in a new sub-listing 208 in the valid branch; the protocol may reject "double spending" postings that transfer the same virtual currency that another postings in the valid branch has already transferred. As a result, in some embodiments the creation of fraudulent postings requires the creation of a longer immutable sequential listing 112 branch by the entity attempting the fraudulent postings than the branch being produced by the rest of the participants; as long as the entity creating the fraudulent postings is likely the only one with the incentive to create the branch containing the fraudulent postings, the computational cost of the creation of that branch may be practically infeasible, guaranteeing the validity of all postings in the immutable sequential listing 112.

Still referring to FIG. 2, additional data linked to postings may be incorporated in sub-listings 208 in the immutable sequential listing 112; for instance, data may be incorporated in one or more fields recognized by block chain protocols that permit a person or computer forming a posting to insert additional data in the immutable sequential listing 112. In some embodiments, additional data is incorporated in an unspendable postings field. For instance, the data may be incorporated in an OP_RETURN within the BITCOIN block chain. In other embodiments, additional data is incorporated in one signature of a multi-signature posting. In an embodiment, a multi-signature posting is posting to two or more addresses. In some embodiments, the two or more addresses are hashed together to form a single address, which is signed in the digital signature of the posting. In other embodiments, the two or more addresses are concatenated. In some embodiments, two or more addresses may be combined by a more complicated process, such as the creation of a Merkle tree or the like. In some embodiments, one or more addresses incorporated in the multi-signature posting are typical cryptocurrency addresses, such as addresses linked to public keys as described above, while one or more additional addresses in the multi-signature posting contain additional data related to the posting; for instance, the additional data may indicate the purpose of the posting, aside from an exchange of virtual currency, such as the item for which the virtual currency was exchanged. In some embodiments, additional information may include network statistics for a given node 304 of network, such as a distributed storage node 304, e.g. the latencies to nearest neighbors in a network graph, the identities or identifying information of neighboring nodes 304 in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node 304) of neighboring nodes 304 in the network graph, IP addresses, GPS coordinates, and other information informing location of the node 304 and/or neighboring nodes 304, geographically and/or within the network graph. In some embodiments, additional information may include history and/or statistics of neighboring nodes 304 with which the node 304 has interacted. In some embodiments, this additional information may be encoded directly, via a hash, hash tree or other encoding.

With continued reference to FIG. 2, in some embodiments, virtual currency is traded as a cryptocurrency. In one embodiment, a cryptocurrency is a digital, currency such as Bitcoins, Peercoins, Namecoins, and Litecoins. Cryptocurrency may be a clone of another cryptocurrency. The cryptocurrency may be an "alt-coin." Cryptocurrency may be decentralized, with no particular entity controlling it; the integrity of the cryptocurrency may be maintained by adherence by its participants to established protocols for exchange and for production of new currency, which may be enforced by software implementing the cryptocurrency. Cryptocurrency may be centralized, with its protocols enforced or hosted by a particular entity. For instance, cryptocurrency may be maintained in a centralized ledger, as in the case of the XRP currency of Ripple Labs, Inc., of San Francisco, Calif. In lieu of a centrally controlling authority, such as a national bank, to manage currency values, the number of units of a particular cryptocurrency may be limited; the rate at which units of cryptocurrency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new cryptocurrency to the miners. Quantities of cryptocurrency may be exchanged using one or more postings as described above.

Referring again to FIG. 1, storing device 104 is designed and configured to store a collection of data 116. Storing device 104 may receive collection of data 116 or a portion thereof from a requesting device 108. Alternatively or additionally, storing device 104 may generate collection of data 116 and/or a portion thereof, for instance by performing one or more calculations, programs, or the like on one or more elements of data that may be received from a requesting device 108, sensors, memory connected to storing device 104, or the like. Collection of data 116 or a portion thereof may be received from a plurality of devices. Any combination of the above-described processes for and/or forms of reception of collection of data 116 is contemplated as within the scope of this disclosure. Requesting device 108 may provide proof of identity, which may be any secure proof of identity including a digital signature and/or secure proof, for instance as described in further detail below.

Still referring to FIG. 1, collection of data 116 may, in a non-limiting example, be transmitted to and/or received by storing device 104 in an encrypted form, which may be encrypted without limitation using any cryptographic system as described above. In an embodiment, encrypted data may be transmitted using a protocol, such as SSL, permitting storing device 104 to decrypt collection of data 116; alternatively or additionally, it might not be possible for storing device 104 to decrypt collection of data 116. In other words, collection of data 116 as used in processes described below may be an encrypted set of data, and all operations in processes as described herein may be performed on encrypted set of data. In an embodiment storage of data as a cyphertext that cannot be decrypted by storage device may aid in trustless delegation of storage, as storage device may be unable to perform any unauthorized analysis and/or distribution of collection of data 116.

With continued reference to FIG. 1, storing device 104 may store collection of data 116 in any suitable data structure and/or data storage facility, including without limitation in a relational database, a key-value retrieval datastore such as a NOSQL database, a distributed hash table, or any other format or structure for use as a datastore that a person skilled in the art would recognize as suitable upon review of the entirety of this disclosure. Data entries of collection of data 116 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a collection of data 116 and/or data structure of facility storing such data may reflect categories, cohorts, and/or populations of data consistently with this disclosure. Data storage may be performed in memory local to storing device 104 and/or may be distributed to one or more remote devices 120, such as data centers and/or other network-connected devices in communication with storing device 104. In an embodiment, storing device 104 may not receive some or all of collection of data 116 directly for storage; for instance, storing device 104 may be in communication with one or more remote devices 120 that store the data, and capable of commanding such remote devices 120 to transmit data and/or cryptographic hashes, encrypted forms, and/or zero-knowledge proofs of possession of data to requesting devices 108 or the like. Storing device 104 may, in a non-limiting example, encrypt some or all of collection of data 116 prior to storage and/or distribution to remote devices 120.

Still referring to FIG. 1, storage device may be configured to divide collection of data 116 into a plurality of lots. Lots may include, without limitation, portions of collection of data 116 that may be converted into accumulated elements 300 as described in further detail below. Each lot may have the same or substantially the same size as each other lot; sizes of lots, for instance in terms of bits and/or bytes of data, may be selected to match input sizes of cryptographic processes such as hashing, encryption, and/or conversion into accumulated elements 300 as described in further detail below.

With continued reference to FIG. 1, storing device 104 may be configured to receive a cryptographic accumulator 124 of the collection of data 116; cryptographic accumulator may be generated by a device providing collection of data to storing device. A "cryptographic accumulator 124," as used in this disclosure, is a data structure created by relating a commitment, which may be smaller amount of data that may be referred to as an "accumulator" and/or "root 308," to a set of elements, such as lots of data and/or collection of data 116, together with short membership and/or nonmembership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root 308, while an element not existing in the larger amount of data can be shown not to be included in the root 308, where "inclusion" indicates that the included element was a part of the process of generating the root 308, and therefore was included in the original larger data set.

Figure 3:
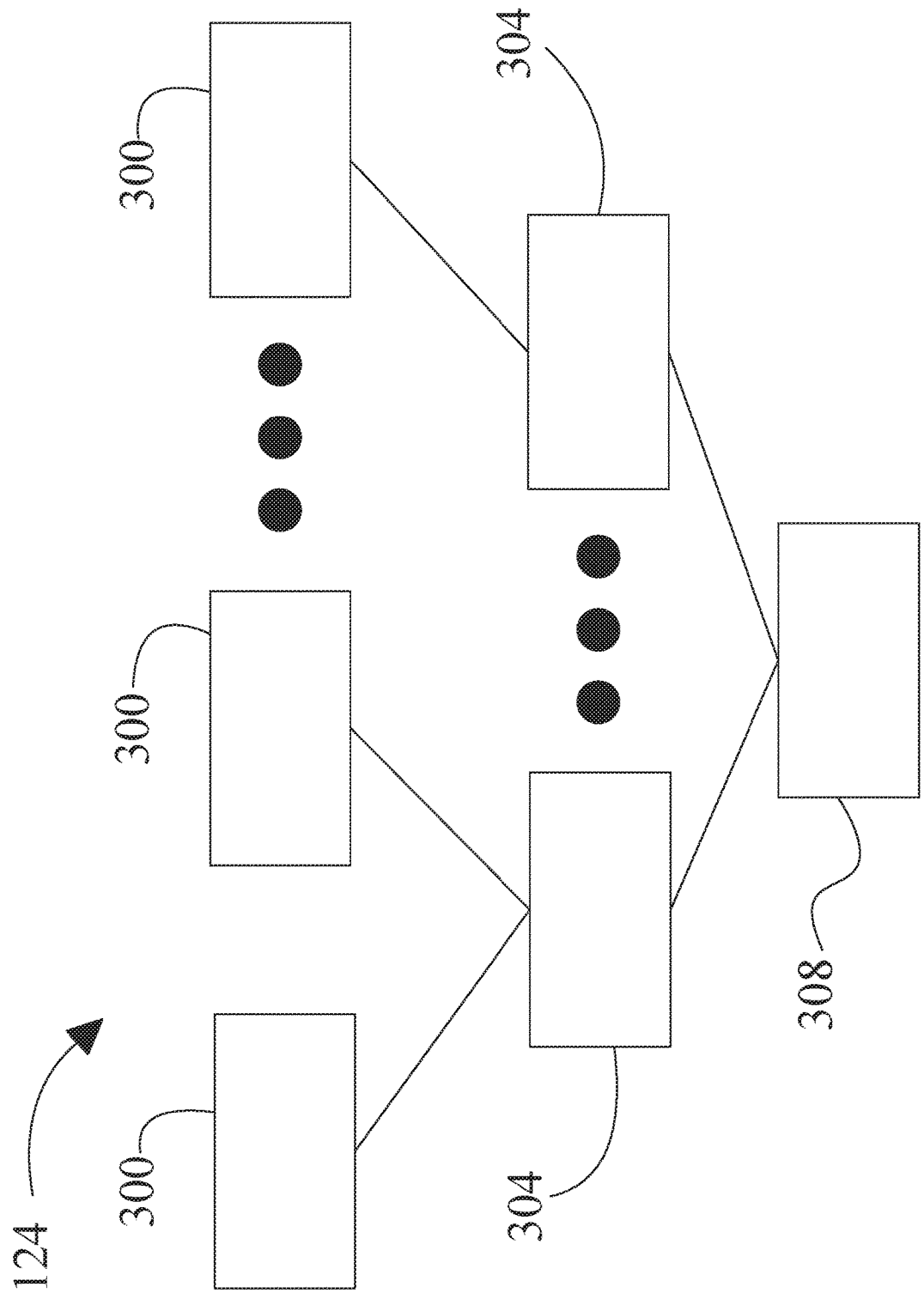
FIG. 3 is a block diagram illustrating an exemplary embodiment of a cryptographic accumulator.

Turning now to FIG. 3, an exemplary embodiment of a cryptographic accumulator 124 is illustrated. Cryptographic accumulator 124 has a plurality of accumulated elements 300, each accumulated element 300 generated from a lot of the plurality of data lots. Accumulated elements 300 are create using an encryption process, defined for this purpose as a process that renders the lots of data unintelligible from the accumulated elements 300; this may be a one-way process such as a cryptographic hashing process and/or a reversible process such as encryption. Cryptographic accumulator 124 further includes structures and/or processes for conversion of accumulated elements 300 to root 308 element. For instance, and as illustrated for exemplary purposes in FIG. 3, cryptographic accumulator 124 may be implemented as a Merkle tree and/or hash tree, in which each accumulated element 300 created by cryptographically hashing a lot of data. Two or more accumulated elements 300 may be hashed together in a further cryptographic hashing process to produce a node 304 element; a plurality of node 304 elements may be hashed together to form parent nodes 304, and ultimately a set of nodes 304 may be combined and cryptographically hashed to form root 308. Contents of root 308 may thus be determined by contents of nodes 304 used to generate root 308, and consequently by contents of accumulated elements 300, which are determined by contents of lots used to generate accumulated elements 300. As a result of collision resistance and avalanche effects of hashing algorithms, any change in any lot, accumulated element 300, and/or node 304 is virtually certain to cause a change in root 308; thus, it may be computationally infeasible to modify any element of Merkle and/or hash tree without the modification being detectable as generating a different root 308. In an embodiment, any accumulated element 300 and/or all intervening nodes 304 between accumulated element 300 and root 308 may be made available without revealing anything about a lot of data used to generate accumulated element 300; lot of data may be kept secret and/or demonstrated with a secure proof as described below, preventing any unauthorized party from acquiring data in lot.

Alternatively or additionally, and still referring to FIG. 3, cryptographic accumulator 124 may include a "vector commitment" which may act as an accumulator in which an order of elements in set is preserved in its root 308 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 124 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e. given an input it is easy to produce an output of the one-way function, but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Referring again to FIG. 1, storing device 104 may receive cryptographic accumulator by receiving cryptographic accumulator from requesting device 108. Storing device may alternatively or additionally generate cryptographic accumulator and/or receive cryptographic accumulator from a third-party device, such as a device from which requesting device 108 requests data be sourced. In an embodiment, storing device 104 may generate a portion of accumulator as required to select an accumulated element as described below; this may be a form of "receiving" accumulator as used in this disclosure.

Continuing to refer to FIG. 1, storing device 104 is configured to evaluate a posting of root to an immutable sequential listing 112. Posting may be performed according to any process for provision of a posting, including without limitation any process described above in reference to FIG. 2; posting may include a digital signature signing root 308. For instance, storing device 104, a requesting device 108 and/or a third-party device may sign root; a device posting root may be the same device that generates cryptographic accumulator and root 308 and/or a different device. For instance, a requesting device that is requesting to receive verification of storage of data produced by and/or possessed by a third-party device may receive therefrom the root 308 and post the root so that verification of storage may be performed. In an embodiment, root may be posted as a digitally signed assertion. Evaluation may include evaluation of a signature of root, evaluation of accumulator to verify that it accumulates the data, evaluation that the root is the root of the accumulator, or the like. Evaluation may include, for instance, randomly selecting a lot of data as described below, generating an accumulated datum as described below, and generating a witness to proof that accumulated datum is accumulated to root; this may include full and/or partial generation of cryptographic accumulator.

Still referring to FIG. 1, storing device 104 may be configured to receive, from a requesting device 108, a request for proof of storage. A "request for proof of storage," as used in this disclosure, is a request to demonstrate that storing device 104 is storing collection of data 116, where storing may include any form of storing as described above. Request for proof of storage may include, without limitation, a proof of identity of the requesting device 108. A "proof of identity" as used in this disclosure is a proof that requesting device 108 is a device having a right of access to collection of data 116. Proof of identity may include a proof of identity of requesting device 108, a proof of an identity of a user of requesting device 108, and/or a proof that requesting device 108 possesses at least a portion of collection of data 116. For instance, and without limitation, proof of identity may include a digital signature, such as a digital signature generated by requesting device 108. Proof of identity may include a secure proof, as described in further detail below, of possession of at least a portion of the data. Proof of identity may be accomplished, without limitation, by a piece or lot of collection of data 116 and providing a hash thereof which storing device 104 may compare to a hash of a corresponding piece of collection of data 116 stored by storing device 104 and/or providing a zero-knowledge or other secure proof of possession of the piece or lot of the collection of data 116 and/or of a preimage of a hash generated therefrom. Where proof of identity includes a digital signature or other secure proof, storing device 104 may compare proof of identity to another proof of identity which requesting device 108 may, for instance, have generated while providing data to be stored. In an embodiment, proof of identity may act as a "retrieval ticket" allowing the device providing it to prove it is an originator or was delegated rights thereby, without necessarily revealing anything else about the requesting device 108, its proprietor.

Still referring to FIG. 1, a request for proof of storage may be posted on immutable sequential listing 112. Posting may be signed with and/or related to proof of identity as described above. Request for proof of storage may refer to posting of root 308; for instance, request for proof of storage may include a reference to a sublisting and/or block containing root 308, a hash and/or checksum of root 308, a time of posting of root 308, and/or root 308 itself. Alternatively or additionally, request may refer to an identity and/or proof of identity, as described above, of storing device 104 and/or an operator and/or user thereof, and/or to an identifier associated with collection of data 116 and/or a portion thereof, where identifier may have been so associated by requesting device 108, storage device, and/or any other device and/or user thereof interacting with and/or incorporated in system 100. Persons skilled in the art, upon reviewing the entirety of this disclosure, will be aware of various ways of referring to an element and/or collection of data 116, a storage location, a storing device 104, a posting regarding the data, and/or any person or device involved in storage and/or retrieval of data, each of which is contemplated as within the scope of this disclosure.

With continued reference to FIG. 1, storing device 104 may be configured to provide a proof of possession of collection of data; provision may be performed in response to a request for proof of possession as described above, and/or may be generated automatically. For instance, and without limitation, proof of possession may be performed upon receiving collection of data. Alternatively or additionally, proof of possession may be provided periodically and/or after some period of time has elapsed. In an embodiment, storing device 104 may provide proof of possession using a secure proof of possession of a lot of data contained in cryptographic accumulator, as follows. Storing device 104 may select an accumulated element 300 as a function of the root 308 and a selection function. A "selection function," as used herein, is a process, program, algorithm, and/or protocol for selection of an accumulated element 300. In an embodiment, selection function may include a function that receives an index value and/or other identifier of a particular accumulated element 300 and returns the accumulated element 300 located at and/or identified by that index value and/or other element; request for proof of storage may, for instance and without limitation, include an index value and/or other identifier to be input to selection function, as a part of a challenge-response protocol. Ranges of possible index values and/or values for identifiers may be determined according to a size of collection of data 116, for instance as measured in bytes, combined with an identity of an encryption process used to produce accumulated elements 300; alternatively or additionally, storing device 104 may store a range and/or list of indices and/or identifier values.

Still referring to FIG. 1, selection function may alternatively or additionally use a random and/or pseudorandom process to select one or more accumulated elements 300; random and/or pseudorandom process may, as a non-limiting example, output an index and/or identifier of one or more accumulated elements 300. A random process may include, without limitation, generating and/or receiving an output from a hardware random number generator (HRNG) and/or true random number generator (TRNG); output may be mapped to a list of possible index values and/or identifiers, for instance by taking the output mod the number of possible index values and/or identifiers. A pseudorandom process may utilize any pseudorandom number generator. As a non-limiting example, selection function may include a public pseudorandom function, defined herein as a pseudorandom function that is reproduceable by any device and/or entity having access to root 308, immutable sequential listing 112, a sublisting thereof, a post thereof, or the like. For instance, and without limitation, public pseudorandom function may generate an index value and/or identifier value of an accumulated element 300 using output of a cryptographic hash of any datum described herein, including without limitation a sublisting, posting, digitally signed assertion, root 308, proof of identity, timestamp, or the like. Where root 308 was produced by a process including a cryptographic hash of some element of data, root 308 itself may be used as a source of a pseudorandom value. Any such value may be taken mod a number of indices and/or identifiers of accumulated elements 300, or otherwise mapped to a list of accumulated elements 300. Persons skilled in the art, upon reading the entirety of this disclosure, will be aware of various ways in which pseudorandom and/or random numbers may be generated and/or utilized to identify an accumulated element 300. Any publicly-known public random and/or pseudorandom function (like sha3) may have some public randomness as described above included as a "salt" to prevent predictability; for instance, a device may be required to incorporate such public randomness, generated for instance using a random and/or pseudorandom number produced by an oracle, third-party device, and/or process that is publicly visible and beyond control of device generating the public random and/or pseudorandom function.

With continued reference to FIG. 1, storing device 104 is configured to generate a secure proof of possession of a data lot used to produce accumulated element 300 as identified using selection function. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and continuing to refer to FIG. 1, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root 308 of a Merkle tree representing evaluation of a secret computation at some number of points, which may be 1 billion points, plus Merkle branches representing evaluations at a set of randomly selected points of the number of points; verification may include determining that Merkle branches provided match the Merkle root 308, and that point verifications at those branches represent valid values, where validity is shown by demonstrating that all values belong to the same polynomial created by transforming the secret computation. In an embodiment, ZK-STARKS does not require a trusted setup.

Still referring to FIG. 1, zero-knowledge proof may include any other suitable zero-knowledge proof. Zero-knowledge proof may include, without limitation bullet-proofs. Zero-knowledge proof may include a homomorphic public-key cryptography (hPKC)-based proof, which may include without limitation creation of a non-interactive zero-knowledge proof using, for instance, lattice-based homomorphic encryption or other homomorphic cryptographic systems, or the like. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, and with continued reference to FIG. 1, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of cryptocurrency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem. Zero-knowledge and/or secure proof may be used, without limitation, to demonstrate that a given ciphertext resulted from encryption under a given encryption key; encryption key may be kept secret during such a proof.

Still referring to FIG. 1, storing device 104 is configured to transmit secure proof and accumulated element 300, as identified using selection function; transmission may include, without limitation, transmission to a requesting device 108. Transmission may be performed according to any process and/or protocol for transmission of data as described above. For instance, and without limitation, transmission may include transmission via TCP-IP, transmission according to an SSL protocol, or the like. Alternatively or additionally, transmission may include posting leaf and/or secure proof to immutable sequential listing 112, which may be accomplished according to any process therefor as described above. In an embodiment, storing device 104 may transmit, to the requesting device 108, a digital signature; digital signature may sign selected leaf and/or secure proof, or may be sent as a separate item. Storing device 104 may generate digital signature using a process that matches an earlier digital signature, where a first signature "matches" a second signature in this context if the first signature is verifiable using the same verification datum as the second signature. For instance, and without limitation, storing device 104 may have signed root 308, for instance as part of creating a digitally signed assertion including root 308 which may have been posted to immutable sequential listing 112, using a particular private key or other secret; storing device 104 may use the same private key, or another private key and/or secret for which signature may be verified using a verification datum, such as a public key corresponding to private key, that was suitable to verify the first digital signature. In so doing, storing device 104 may demonstrate that it is the same entity and/or device identified earlier, such as without limitation the device that posted root 308 as described above.

In an embodiment, and still referring to FIG. 1, storing device 104 may be configured to provide collection of data 116 to a requesting device 108, which may include without limitation any requesting device 108 as described above; requesting device 108 may include, for instance, a device that provided collection of data 116 to storing device 104, a device that is or was requesting proof of storage, and/or a device that has requested output of and/or inputs to a program. In an embodiment, storing device 104 may receive a request for stored data from requesting device 108. Request may include, without limitation, any element of data suitable for inclusion in request for proof of storage, including proof of identity of requesting device 108, a hash or other datum derived from collection of data 116, or the like. Request may be transmitted directly to storing device 104 and/or may be posted to immutable sequential listing 112. Storing device 104 may evaluate proof of identity or other elements or request to determine whether requesting device 108 is authorized to receive data. Storing device 104 may transmit collection of data 116 in response to request; transmission may include encryption, such as encryption using a public key for which requesting device 108 possesses a private key, encryption using a key that has been shared via SSL or other key-exchange protocols between requesting device 108 and storing device 104, or the like. Transmission may include encryption of data collection prior to transmission using an encryption key for which the corresponding decryption key is possessed solely by storing device 104 and/or is not possessed by receiving device; decryption for receiving device may be accomplished as part of a zero-knowledge contingent payment protocol as described below.

Continuing to refer to FIG. 1, storing device 104 may be configured to receive a payment for one or more of proof of storage and/or transmission of stored data. In an embodiment, a payment may include a payment in cryptocurrency and/or via any other transfer of value on immutable sequential listing 112. Alternatively or additionally, storing device 104 may be configured to receive a locked payment. A "locked payment," as used in this disclosure, is a payment that a paying party is committed to but may only be processed upon a contingent event occurring. Thus, once a locked payment has been posted, it may be irrevocable for the payer that posts it, but unavailable to the recipient device until the latter has performed an action upon which unlocking the payment is contingent. As a non-limiting example, locked payment may include a zero-knowledge contingent payment. A "zero-knowledge contingent payment," as used in this disclosure, is a payment that is posted in a non-spendable form, which may be converted to a spendable form by provision of an element of data. A proprietor and/or community operating immutable sequential listing 112 may require a secure proof, a password, or other provision of datum and/or proof of performance of a given process as a condition for a valid expenditure of value in the zero-knowledge contingent payment. In an embodiment, storing device 104 may create a locked payment as a good-faith bond, for instance to insure against the possibility of loss of data or the like; locked payment may be released upon failure of storing device 104 to demonstrate storage of data.

As a non-limiting example, and without limitation, a zero-knowledge contingent payment may be arranged for transmission and decryption of collection of data 116, or a portion thereof, as follows: storing device 104 may encrypt collection of data 116 and/or portion thereof to produce a cyphertext, using a secret key K; K may be a symmetric key, such as an AES key, or may have a corresponding decryption key—for the purposes of discussion it will be assumed K is the decryption key, but a method for a decryption key differing from K may be performed using the following protocol as well. K may be generated randomly and/or by a pseudorandom process. Storing device 104 may generate a cryptographic hash of K. Hash of key and encrypted collection of data 116 and/or portion thereof may be transmitted to requesting device 108. Storing device 104 may further generate a secure proof, which may, without limitation, include a zero-knowledge proof, of possession by storing device 104 of the preimage of the hash of K (i.e., of K). Requesting device 108 may evaluate hash and/or secure proof. Requesting device 108 may post password-locked payment to immutable sequential listing 112, which payment is spendable only upon provision of K; as a result, spending payment may necessarily include publicly posting K, permitting decryption of cyphertext. In an embodiment, use of a locked payment may permit payment for delivery of collection of data 116 while preventing requesting device 108 and/or proprietor thereof from failure to pay and preventing storing device 104 from receiving payment while failing to provide the collection of data 116.

In an embodiment, and continuing to refer to FIG. 1, storing device 104 may receive a locked payment redeemable upon proof of storage. Locked payment may be provided by posting at immutable sequential listing 112. Locked payment may, for instance, be a zero-knowledge contingent payment or similar structure that, to be spent, requires public provision of zero-knowledge proof of preimage of accumulated element 300, potentially in combination with accumulated element 300 itself. As a non-limiting example, locked payment may be spendable only upon proof of possession as described above; for instance the locked payment may require the satisfaction of some proof (whether it is accumulator membership directly or a ZK proof) in order to unlock. Such a scheme may also require storing device 104 and/or a user thereof to lock up some quantity of value and/or currency, to ensure money, ensuring that it and/or she will not default on its or her obligation to store.

Still referring to FIG. 1, any datum sent, received, and/or posted to immutable sequential listing 112, including without limitation any collection of data, cryptographic accumulator or portion thereof including accumulated datums, branches, witnesses, and/or root 308, any request for proof of storage, any portion of proof of storage, including without limitation secure proof, and/or any locked payment, secure proof associated therewith, and/or password or other data to unlock secure proof, and/or any cryptographic key and/or hash thereof, may be digitally signed. Any such datum may alternatively or additionally be timestamped; timestamp may be digitally signed. For instance, periodic proofs of storage produced according to some period of elapsed time after which new proofs should be generated may each be associated with and/or signed together with a timestamp illustrating a time at which secure proof was generated. Timestamp may be created using and/or combined with a public random and/or pseudorandom function, such as generation of a number using any protocol described above therefor based on a current instance of immutable sequential listing and/or a portion thereof and/or posting thereto; currency at time of generation may render such a timestamp impossible or essentially impossible to generate before the purported time of generation. Secure proof, for instance, may "sign" such a timestamp, such that secure proof demonstrates both possession and currency of possession of a lot of data as described above.

Continuing to refer to FIG. 1, timestamp may include, without limitation, a secure timestamp. A secure timestamp may, without limitation, include a timestamp created by or linked to incorporation of a current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, including without limitation any random and/or pseudorandom number generated as described in this disclosure. Additional data may include one or more additional data, including sensor data or a hash of data, that are received or generated by temporal attester. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized may be substantially similar to the RFC 3161 standard. In this scenario, the received data signals are locally processed at the listener device by a one-way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data, e.g. sensor data, along with the local timestamp of the device.

Still referring to FIG. 1, a period of time to elapse between proofs of storage may be set at some default quantity of seconds or other units of time and/or may be set by storing device and/or requesting device; for instance, a device having the right to receive data from storing device 104 and/or associated with an entity paying for storage and/or transmission of data may establish a frequency with which proof of storage will occur. Storing device may then post payment with such frequency. Alternatively or additionally, a frequency and/or period of checking may be established according to an automated procedure, such as receiving, by any device in system 100, a number indicating a level of importance of data, for instance on a scale rating importance from a minimal number to a maximal number (e.g., 1-10), or the like, and converting that level of importance to a frequency of proof of storage, where more frequent proofs of storage are posted for more valuable data. Frequency of proof of storage may be set according to locked payment value for instance, a locked payment posted by storing device and/or a user thereof or commonly owned device may cause a lower frequency of proofs for a higher value and a higher frequency of proofs for a lower value and/or lack of locked payment; a locked payment of data owner and/or requesting device may set a frequency of proofs according to a value placed by data owner on collection of data, such that a higher value leads to more frequent proofs. Alternatively or additionally, frequency of proofs may be set by selection of an initial default frequency and multiplication by factors calculated according to each or all of values of locked payments by storing device 104, values of locked payments by data owner, values of locked payments by requesting device, level of importance of data, or the like.

Figure 4:
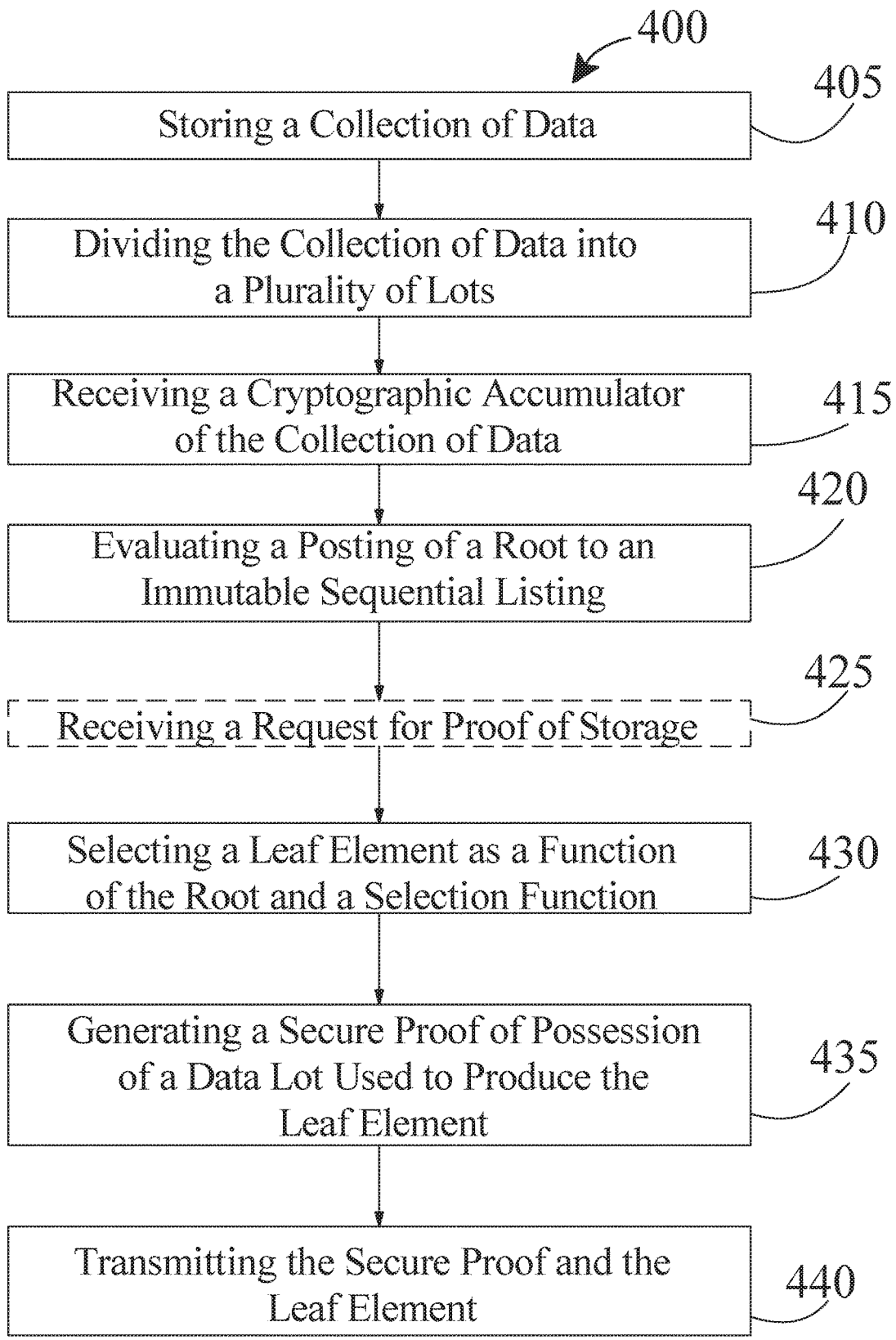
FIG. 4 is a flow diagram illustrating an exemplary embodiment of a method of trustlessly proving possession of secured data.

Referring now to FIG. 4, an exemplary embodiment of a method 400 of trustlessly proving possession of secured data is illustrated. At step 405, a storing device 104 stores a collection of data 116; this may be implemented, without limitation, as described above in reference to FIGS. 1-3. At step 410, storing device 104 divides collection of data 116 into a plurality of lots; this may be implemented, without limitation, as described above in reference to FIGS. 1-3. At step 415, storing device 104 receives a cryptographic accumulator 124 of collection of data 116, the cryptographic accumulator 124 having a root 308 and a plurality of accumulated elements 300, wherein each accumulated element 300 is produced by performing an encryption process on each lot of plurality of lots; this may be implemented, without limitation, as described above in reference to FIGS. 1-3. Cryptographic accumulator 124 may include a Merkle tree.

At step 420, and still referring to FIG. 4, storing device 104 evaluates a posting of root 308 to an immutable sequential listing 112; this may be implemented, without limitation, as described above in reference to FIGS. 1-3. Posting the root 308 to the immutable sequential listing 112 may include digitally signing the root 308. At optional step 425, storing device 104 may receive, from a requesting device 108, a request for proof of storage; this may be implemented, without limitation, as described above in reference to FIGS. 1-3. Receiving the request may include receiving a proof of identity of the requesting device 108. Proof of identity may include a digital signature. Proof of identity may include a secure proof of possession of at least a portion of the data.

At 430 and continuing to refer to FIG. 4, storing device 104 selects an accumulated element 300 as a function of root 308 and a selection function; this may be implemented, without limitation, as described above in reference to FIGS. 1-3. Selection function may include a public pseudorandom function. Selection function may include a generation of a mathematical representation of at least a portion of the immutable sequential listing 112. At least a portion of the immutable sequential listing 112 may include the root 308. At step 435, storing device 104 generates a secure proof of possession of a data lot used to produce accumulated element 300; this may be implemented, without limitation, as described above in reference to FIGS. 1-3. At step 440, storing device 104 transmits secure proof and accumulated element 300; this may be implemented, without limitation, as described above in reference to FIGS. 1-3.

Still referring to FIG. 4, any requesting and/or third-party device may perform any step of generation of cryptographic accumulators, roots, postings, signatures, locked payments, secure proofs, and/or conditions for release of locked payments, as described in this disclosure. Any requesting and/or third-party device may perform any step of evaluation of cryptographic accumulators, roots, postings, signatures, locked payments, secure proofs, and/or conditions for release of locked payments, as described in this disclosure.

Embodiments disclosed herein may confer various advantages as compared to conventional approaches. For instance, and without limitation, processes as described above may enable production, request, and/or requirement of multiple proofs throughout a storage period; this may obviate need for renewal of storage and/or storage agreements by an online data owner. Conventional techniques may require both the data owner and the storage provider to be online and create a new proof every time they want to renew storage; in contrast, embodiments described in this disclosure may allow a single proof to continue indefinitely such that no new proof agreement is needed if storage is to be extended. Unlike other decentralized storage solutions like IPFS/Filecoin or Sia, embodiments described in this disclosure notably may not require a data owner to periodically query and test that the remote parties properly hold the data in order to ensure that the data is still being stored and is available. Embodiments may additionally, permit storage to be re-outsourced readily to tertiary parties.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
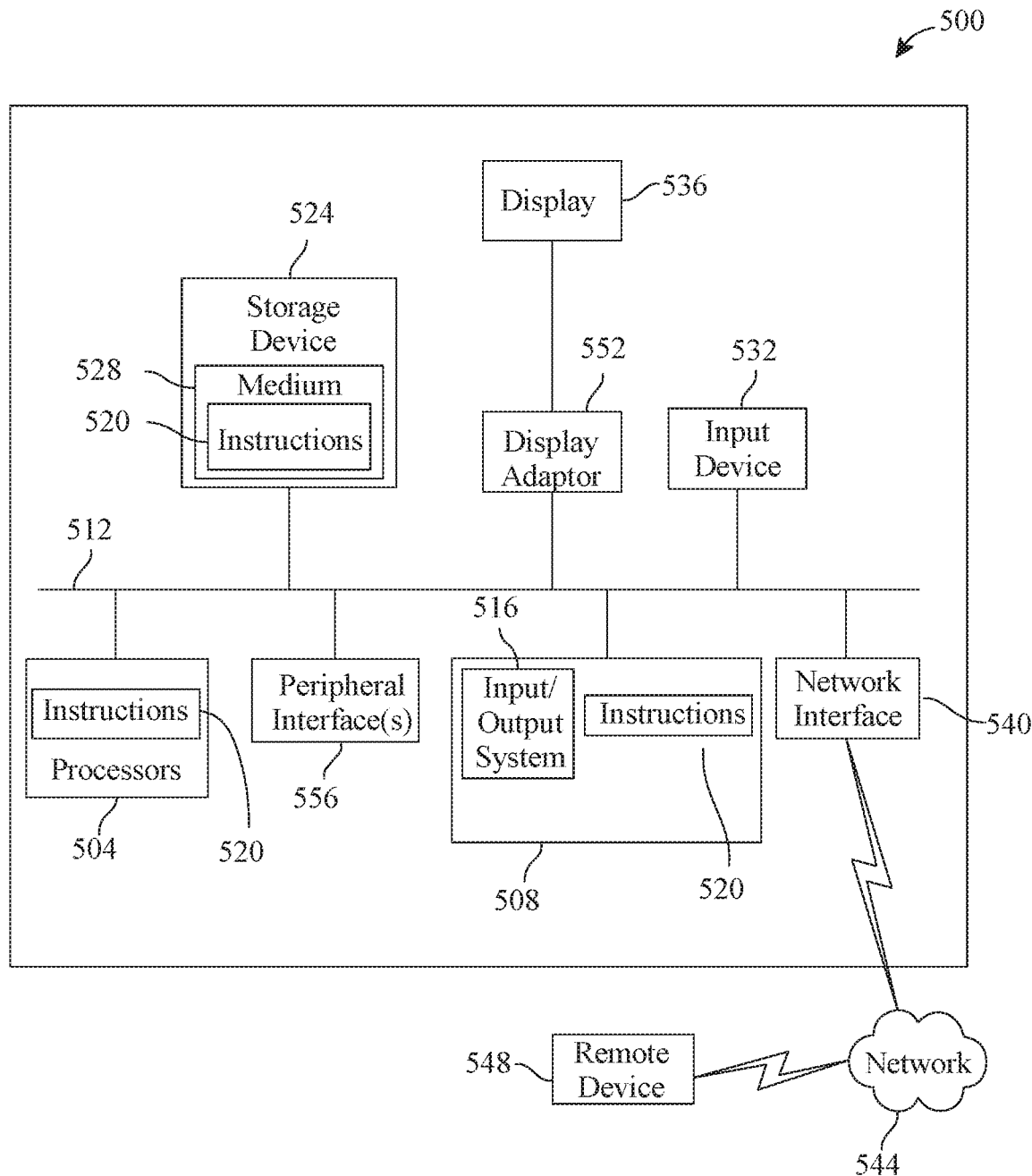
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 120 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods as described in this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for trustlessly proving possession of secured data, the system comprising a storing device designed and configured to:
store a collection of data;
divide the collection of data into a plurality of lots;
receive a cryptographic accumulator of the collection of data, the cryptographic accumulator having a root and a plurality of accumulated elements, wherein each accumulated element is produced by performing an encryption process on each lot of the plurality of lots;
evaluate a posting of the root to an immutable sequential listing;
select an accumulated element as a function of the root and a public pseudorandom function, wherein selecting further comprises:
providing a plurality of identifiers of the plurality of accumulated elements, the plurality of identifiers associated with the root;
generating an output of the public pseudorandom function, wherein the output indicates an identifier of the plurality of identifiers; and
selecting the accumulated element associated with the identifier;
generate a secure proof of possession of a data lot used to produce the accumulated element; and transmit the secure proof and the accumulated element.

2. The system of claim 1, wherein the storing device is further configured to store the collection of data further comprises encrypting the collection of data.

3. The system of claim 1, wherein the encryption process further comprises a cryptographic hashing process.

4. The system of claim 1, wherein the cryptographic accumulator further comprises a Merkle tree.

5. The system of claim 1, wherein the storing device is further configured to evaluate a digital signature signing the root.

6. The system of claim 1, wherein the storing device is further configured to receive the request by receiving a proof of identity of the requesting device.

7. The system of claim 6, wherein the proof of identity further comprises a digital signature.

8. The system of claim 6, wherein the proof of identity further comprises a secure proof of possession of at least a portion of the data.

9. The system of claim 1, wherein the selection function includes a generation of a mathematical representation of at least a portion of the immutable sequential listing.

10. The system of claim 9, wherein the at least a portion of the immutable sequential listing is the root.

11. A method of trustlessly proving possession of secured data, the method comprising: storing, by a storing device, a collection of data;
dividing, by the storing device, the collection of data into a plurality of lots;
receiving, at the storing device, a cryptographic accumulator of the collection of data, the cryptographic accumulator having a root and a plurality of accumulated elements, wherein each accumulated element is produced by performing an encryption process on each lot of the plurality of lots;
evaluating, by the storing device, a posting of the root to an immutable sequential listing;
selecting, by the storing device, an accumulated element as a function of the root and a public pseudorandom selection function, wherein selecting further comprises:
providing a plurality of identifiers of the plurality of accumulated elements, the plurality of identifiers associated with the root;
generating an output of the public pseudorandom function, wherein the output indicates an identifier of the plurality of identifiers; and selecting the accumulated element associated with the identifier;

generating, by the storing device, a secure proof of possession of a data lot used to produce the accumulated element; and transmitting, by the storing device, the secure proof and the accumulated element.

12. The method of claim 11, wherein the cryptographic accumulator further comprises a Merkle tree.

13. The method of claim 11, wherein evaluating the root posted to the immutable sequential listing further comprises evaluating a digital signature digitally signing the root.

14. The method of claim 11, wherein receiving the request further comprises receiving a proof of identity of the requesting device.

15. The method of claim 14, wherein the proof of identity further comprises a digital signature.

16. The method of claim 14, wherein the proof of identity further comprises a secure proof of possession of at least a portion of the data.

17. The method of claim 11, wherein the selection function includes a generation of a mathematical representation of at least a portion of the immutable sequential listing.

18. The method of claim 17, wherein the at least a portion of the immutable sequential listing is the root.

19. A non-transitory computer-readable storage medium containing machine-executable instructions for performing a method of trustlessly proving possession of secured data, the method comprising: storing, by a storing device, a collection of data;

dividing, by the storing device, the collection of data into a plurality of lots;

receiving, at the storing device, a cryptographic accumulator of the collection of data, the cryptographic accumulator having a root and a plurality of accumulated elements, wherein each accumulated element is produced by performing an encryption process on each lot of the plurality of lots;

evaluating, by the storing device, a posting of the root to an immutable sequential listing;

selecting, by the storing device, an accumulated element as a function of the root and a public pseudorandom selection function, wherein selecting further comprises:

providing a plurality of identifiers of the plurality of accumulated elements, the plurality of identifiers associated with the root;

generating an output of the public pseudorandom function, wherein the output indicates an identifier of the plurality of identifiers; and selecting the accumulated element associated with the identifier;

generating, by the storing device, a secure proof of possession of a data lot used to produce the accumulated element; and transmitting, by the storing device, the secure proof and the accumulated element.

* * * * *